United States Patent [19]

Langweiler

[11] 3,855,529
[45] Dec. 17, 1974

[54] MEASURING ARRANGEMENT FOR DETERMINING THE AIR-GAP FLUX OF A ROTATING-FIELD MACHINE

[75] Inventor: Frank Langweiler, Erlangen, Germany

[73] Assignee: Siemens Aktiengesellschaft, Munich, Germany

[22] Filed: June 14, 1972

[21] Appl. No.: 262,731

[30] Foreign Application Priority Data
June 19, 1971 Germany.............................. 2130556

[52] U.S. Cl............................. 324/158 MG, 324/45
[51] Int. Cl......................... G01r 33/02, G01r 33/06
[58] Field of Search.......... 324/158 MG, 158 R, 45, 324/127, 117 R, 117 H

[56] References Cited
UNITED STATES PATENTS
1,522,196  1/1925  MacMillan .................. 324/158 MG
3,624,504  11/1971  Joly ............................ 324/158 MG Primary Examiner—Alfred E. Smith
Assistant Examiner—Ernest F. Karlsen
Attorney, Agent, or Firm—Kenyon & Kenyon Reilly Carr & Chapin

[57] ABSTRACT

A measuring arrangement for determining the air-gap flux of a rotating-field machine is disclosed. A measuring detector is placed in a recess formed in the inner surface of the laminated stator of the machine at the working air-gap thereof. The sensitive region of the detector extends in the circumferential direction of the stator a distance corresponding approximately to the projection of the rotor slot pitch onto the inner surface of the stator. For the measuring detector, a galvanomagnetic device such as a Hall generator probe or group of Hall generators is suitable.

5 Claims, 4 Drawing Figures

MEASURING ARRANGEMENT FOR DETERMINING THE AIR-GAP FLUX OF A ROTATING-FIELD MACHINE

BACKGROUND OF THE INVENTION

The invention relates to a measuring apparatus for determining the air-gap flux of rotating-field machines.

For the control of the flux in rotating-field machines, such as synchronous or asynchronous machines, it is necessary to ascertain the actual value of the air-gap flux. If the air-gap flux of rotating-field machines is detected by a point or an almost point like measurement on the stator side, the measured value includes harmonics which are caused by the varying reluctance of the teeth and the slots of the rotor. The frequency of these harmonics is $n_1/p$ times that of the fundamental frequency where $n_1$ is the number of rotor slots and $p$ the number of pole pairs.

SUMMARY OF THE INVENTION

It is an object of the invention to provide a measuring arrangement for measuring air-gap flux which suppresses the harmonics caused by the rotor slots as discussed above.

It is not possible to remove these harmonics by electrical smoothing of the signal because measurements may have to be made when the machine is standing still. Accordingly, it is another object to provide a measuring arrangement which will also satisfy this last-mentioned requirement.

Tests and analytical considerations based on the tests have determined that the harmonic content in the measured value can be suppressed if, according to a feature of the invention, flux detection means is located in a recess in the stator stack on the side of the working air-gap. Also the region over which the probe is active in the circumferential direction of the stator corresponds approximately to the center spacing of the rotor slots projected onto the stator. The flux detection means can be a measuring probe comprising an induction loop or a semiconductor configuration in the form of a galvanomagnetic device such as a Hall generator probe or a group of Hall generators.

The integration over the length of the rotor slot pitch is achieved preferably by means of Hall-Effect generator probes. It is efficacious to provide a probe with at least two Hall-Effect generators should a single Hall-Effect generator not have the required dimensions.

Although the invention is illustrated and described herein as a measuring arrangement for determining the air-gap flux of a rotating-field machine, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 2 shows the waveform of the measured air-gap flux obtained when the measuring detector is such that its sensitive region is point-like.

DESCRIPTION OF THE PREFERRED EMBODIMENTS

Figure 1:
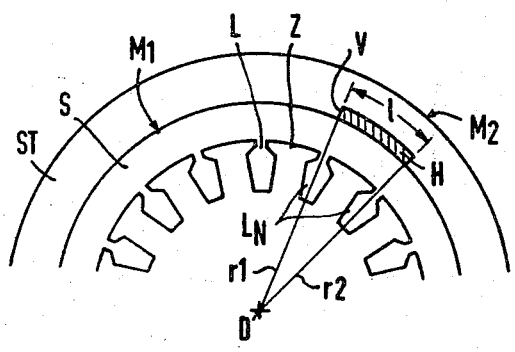
FIG. 1 is a schematic diagram illustrating the disposition of a flux detector with respect to the working air-gap of a rotating-field machine according to the air-gap flux measuring arrangement of the invention.
Figure 2:
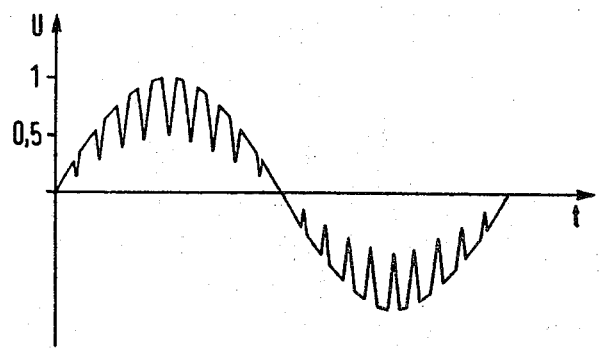

Referring to FIG. 1, if the measuring location M1 for receiving the measuring probe in the stator stack ST is only point-like or nearly so, the measured value will include harmonics as is illustrated in FIG. 2 where the waveform of the measured value is plotted for a sinusoidal motor voltage.

Harmonics can, however, be avoided if the measuring location M2 for receiving the measuring probe is not point-like, but instead, has a length in the circumferential direction of the stator ST which is equal to the rotor slot pitch radially projected on the stator ST. The rotor slots are designated in FIG. 1 with L and the rotor teeth with Z. From the center of rotation D of the machine, two radial lines r1 and r2 are drawn through the centers of two mutually adjacent rotor slots $L_N$ and extend to correspond to the inside diameter of the stator.

According to the invention, a recess V is provided in the stator stack ST on the side facing the working air-gap S and has at least the length 1. The probe H is then embedded in the recess and can be, for example, an induction loop, a field plate, a Hall-Effect generator or the like. The probe should be sensitive over the length 1 and the measuring probe should be equally sensitive at all points. With these features of the invention, an integration or formation of a mean over a distance can be achieved.

Figure 3A:
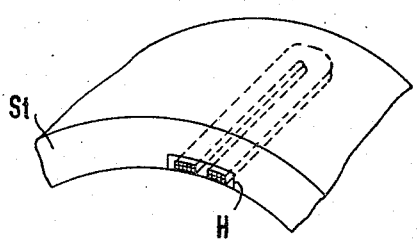
FIGS. 3A and 3B illustrate embodiments of the measuring detector in the form of an induction loop and a Hall-Effect generator probe respectively.
Figure 3B:
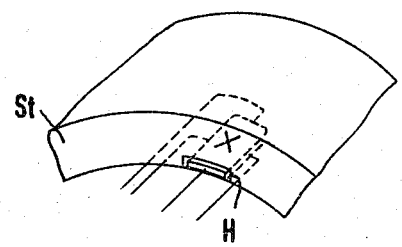

FIG. 3A shows an induction loop which is one embodiment for measuring detector and, FIG. 3B shows an alternate embodiment of the detector in form of a Hall-Effect generator probe.

For the situation where no relative velocity between the field and the measuring probe exists, Hall-Effect probes are preferably used as a detector, otherwise for this condition, induction loops can be used as the detector. If Hall-Effect generators are used they should be configured so that the length-to-width ratio produces the required uniform distribution of sensitivity. If such a Hall-Effect generator is not available, it is preferable to replace it by two or more smaller Hall-Effect generators having output signals which are added.

For securing the Hall-Effect generators in the recess V which has a depth of about 1 mm, silicon rubber, which has good adhesive properties, can be used, for example. For protection against ground short circuits, it is efficacious to cement a self-sticking teflon foil between the Hall-Effect generator and the stator stack. The connection cables are advantageously brought out in the next adjacent stator slot having a wedge shape which should be suitably deepened for this purpose. The connection cables are then run to a separate terminal box of the motor.

What is claimed is:

1. Arrangement for determining the air-gap flux of a rotating-field machine having a laminated stator and a rotor having a plurality of slots, the inner surface of the stator and the rotor conjointly defining a working air-gap, comprising recess means formed in the inner surface of the stator, and a semiconductor arrangement responsive to a magnetic field disposed in said recess means and having a sensitive region extending in the circumferential direction of the stator a distance corresponding approximately to the projection of the rotor slot pitch onto the inner surface of the stator.

2. Arrangement of claim 1, said semiconductor arrangement having a sensitive region extending in the circumferential direction of the stator corresponding approximately to the radial projection of the rotor slot pitch onto the inner surface of the stator.

3. Arrangement of claim 1, said recess means being a recess formed in the inner surface of the laminated stator.

4. Arrangement of claim 1, said semiconductor arrangement being a group of semiconductors disposed in said recess.

5. Arrangement of claim 1, said semiconductor arrangement comprising at least one Hall-Effect generator.

* * * * *